Figure 4:
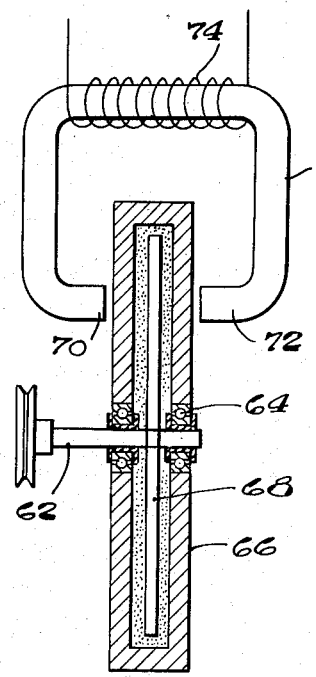

Feb. 7, 1956 E. J. SAXL 2,733,792
CLUTCH WITH MAGNETIC FLUID MIXTURE
Filed June 22, 1950 3 Sheets-Sheet 1
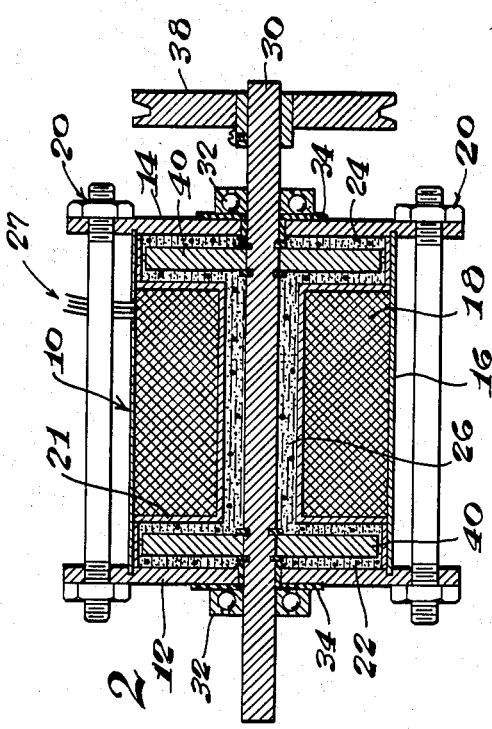
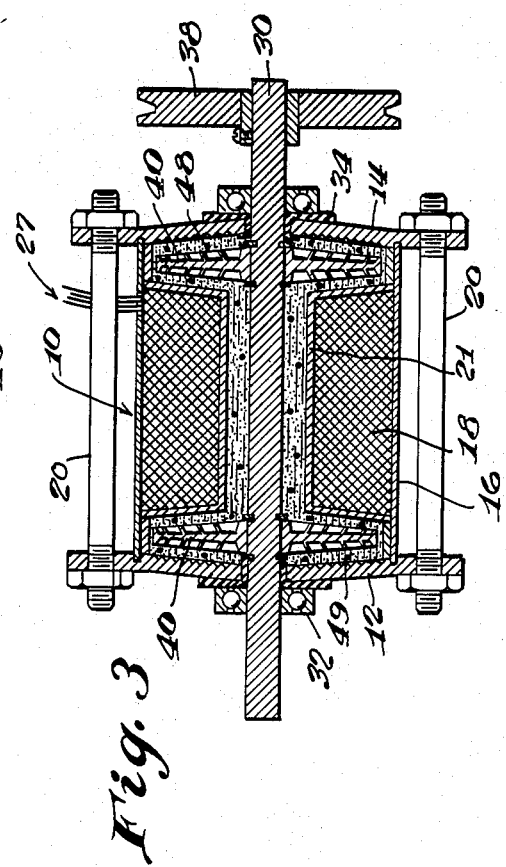
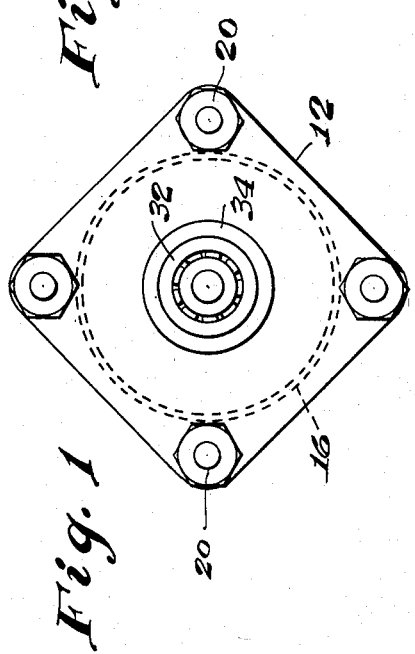
Inventor
Erwin Joseph Saxl
By J. Stanley Churchill.
Attorney Feb. 7, 1956 E. J. SAXL 2,733,792
CLUTCH WITH MAGNETIC FLUID MIXTURE
Filed June 22, 1950 3 Sheets-Sheet 2

Inventor
Erwin Joseph Saxl
By J. Stanley Churchill
Attorney

Feb. 7, 1956 E. J. SAXL 2,733,792
CLUTCH WITH MAGNETIC FLUID MIXTURE
Filed June 22, 1950 3 Sheets-Sheet 3

Inventor
Erwin Joseph Saxl
By J. Stanley Churchill.
Attorney

United States Patent Office 2,733,792
Patented Feb. 7, 1956

2,733,792

CLUTCH WITH MAGNETIC FLUID MIXTURE

Erwin J. Saxl, Harvard, Mass.

Application June 22, 1950, Serial No. 169,711

2 Claims. (Cl. 192—21.5)

This invention relates to an electromagnetic apparatus for controlling the relative rotation of two members, one of which comprises an electromagnet.

In general the object of the invention is to provide novel and efficient apparatus of the character described embodying an electromagnet and a relatively large number of magnetizable relatively small members mounted to assume positions when magnetized by the electromagnet so as to control the relative rotation of the two members and wherein provision is made for maintaining the magnetizable members out of contact with the windings of the electromagnet to the end that the apparatus may be used for long periods of time without destruction or deterioration of such coil windings.

A further object of the invention is to provide novel and improved apparatus of the character described embodying a rotor and wherein an electromagnetic means is provided for enabling the creation of a magnetic field through which a rotor is arranged to be rotated. The electromagnetic means is mounted to surround the rotor and is separated therefrom by a housing enclosing a relatively large number of small magnetizable members, and preferably small particles, and a suitable vehicle, as will be described, whereby during the operation of the apparatus the relative movement of the rotor with respect to the surrounding electromagnet may be controlled by the magnetization of the small members or particles while maintaining the members or particles and vehicle out of contact with the windings of the electromagnet.

In its broader aspects the invention may be used as a brake or a clutch.

With these general objects in view and such others as may hereinafter appear, the invention consists in the apparatus for controlling the relative rotation of two members, and more particularly to the various structures of electromagnetic brake or clutch hereinafter described and particularly defined in the claims at the end of this specification.

In the drawings, Figs. 1 and 2 illustrate in end elevation and vertical section respectively one form of electromagnetic brake embodying the invention; Fig. 3 is a vertical sectional view of a modified form of an eletromagnetic brake embodying the invention; and Figs. 4, 5, 6, 7, 8, and 9 are vertical sectional views illustrating different forms of electromagnetic brakes or clutches embodying the invention.

In general the present invention contemplates an electromagnetic apparatus which may in its broader aspects be used as either a clutch or a brake mechanism wherein the relative rotation of a rotor with respect to an electromagnet is, in accordance with the present invention, controlled by a relatively large number of magnetizable particles enclosed within a housing to be maintained out of contact with the windings of the electromagnet and which are arranged when magnetized to assume a position to frictionally engage or connect the rotor and electromagnet functioning either as a clutch between the two or to exert braking effect on the rotor. For purposes of illustration the invention has been illustrated in various embodiments of an electromagnetic brake.

Referring now to the drawings, in the embodiment of the invention illustrated in Figs. 1 and 2, the present electromagnetic brake includes a housing 10 formed by two end plates 12, 14 and a cylindrical body portion 16 having the ends thereof set into circular grooves in the adjacent faces of the end plates 12, 14, the whole being secured together by bolts 18 and nuts 20 as shown. The housing 10 is arranged to enclose the coil windings 18 of an electromagnet, and as illustrated in Fig. 2, such windings 18 are mounted on a metal spool-like support 21 which is welded or otherwise secured to the body 16 of the housing to form within the spool two cylindrical chambers 22, 24, one at each end of the main housing 10, and a smaller connecting cylindrical chamber 26 through which a rotatable shaft 30 is extended. The shaft 30 comprises the rotor and is mounted on ball bearings 32 at each end of the housing and sealed with suitable seals 34 to maintain the vehicle to be described in the chambers 22, 24, 26 of the housing 16 through which the rotor is extended as shown. The rotor may be provided with a pulley 38 to effect rotation thereof. The rotor is provided with two magnetizable disks 40 secured thereon, one disposed in each of the end chambers 22, 24 as shown in Fig. 2, and the two end chambers and the connecting intermediate chamber 26 are filled with a large number of relatively small magnetizable members which may vary in size, depending upon the use to which the apparatus is to be put, from a powder to a finely divided metal particle up to preformed metal members the size of small balls. These relatively small magnetizable members may be suspended in air or other gaseous mediums, or they may be suspended in oil, or in liquids such as silicons. They may be of such physical size that they settle from the vehicle when not magnetized, or they may be in such a fine state of subdivision that with proper emulsifying agents they may be suspended in the vehicle, such as in oil or in silicons.

In operation when power is applied to the rotor 30 and until electrical energy is supplied to the electromagnet through the leads 27, the rotor rotates freely in the ball bearings, and the members or particles freely move with relation to one another, offering minimum frictional resistance to the rotation of the rotor. However, when the coil is energized by electrical energy supplied through the leads 27 an electromagnetic field is set up, which penetrates through the rotatable magnetizable disks 40 and returns through the magnetic short circuit presented by the rest of the housing 10. The lines of force emanating in this closed electromagnetic circuit magnetize the small members or particles within the chambers 22, 24, 26, which lose, while magnetized, their ease of motion one on the other, and as a result become oriented, due to their magnetization, so that the vehicle and mass of particles become relatively rigid operating to exert a maximum frictional resistance to the rotation of the rotor, and exerting a braking effect thereon.

In the event that the coil of the electromagnet is rotated then the effect of the magnetization of the small members or particles within the chambers 22, 24, 26 is one of connecting together the rotor and the rotatable element of which the electromagnet forms a part and thus effectively clutching the rotor and such element together.

In Fig. 3 I have illustrated a modified form of the apparatus shown in Fig. 2 wherein the disks 40 take the form of tapered vanes providing increased strength at their base or central portions. Preferably the formation of the spool and the end plates will be such as to conform generally to the surfaces of the vanes and to provide clearance for the liquid or fluid vehicle and the particles suspended therein around both sides and top of the vanes so that in operation when magnetized the mass may frictionally engage the maximum surface of the vanes. In Fig. 3 I have illustrated the vanes as provided with serrations 48 in which the semi-rigid mass of magnetized particles can congregate thereby enabling the mass to exert increased friction between the rotor and the static portion of the housing. These serrations may take various forms depending upon the type of particle suspended in the vehicle.

As illustrated in Figs. 4, 5, 6, 7 and 8, various modified forms of braking mechanism are shown. In Fig. 4, 60 represents a core of a magnet of general U-shape or horseshoe shape, and a rotor 62 journalled in bearings 64 in a closed housing 66 is arranged to rotate a magnetizable disk 68 disposed within the housing. The housing may enclose or be filled with a suitable vehicle, as above described, containing small magnetizable members or particles, and the housing 66 and the disk 68 are arranged to have one portion thereof disposed between the poles 70, 72 of the electromagnet 60 so that when electrical energy is supplied to the winding 74 of the magnet, the magnetic field set up operates to magnetize the particles and exert a braking effect upon the rotary motion of the disk 68 in a manner similar to that above described in connection with Figs. 1 and 2.

Figure 5:
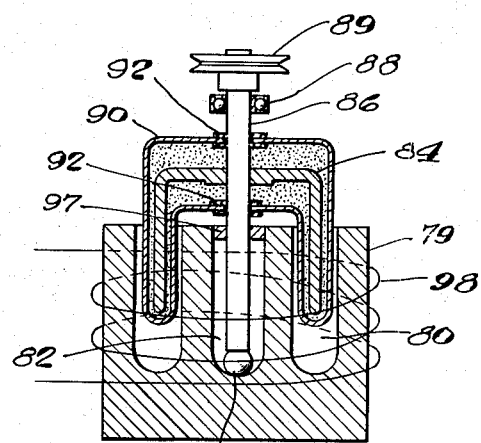

In Fig. 5 I have illustrated a further modified form of a braking mechanism wherein the electromagnet 79 is stationary and provided with an annular recess 80 and a central recess 82. The rotor comprises a cylindrical cup-shaped member 84 secured to a vertical axle 86 journalled in bearings 88 provided with a pulley 89 for the application of power thereto. A stationary housing 90 is mounted in any suitable manner and through which the axle 86 extends, suitable seals 92 being provided to retain within the housing the vehicle and suspended particles or small magnetizable members above referred to. The lower end of the axle may be mounted upon a ball bearing 96 and the axle further rotatably supported in a bearing 97 at the top of the magnet. The magnet is provided with the usual coils 98 now commonly employed in a so-called pot magnet. In the operation of the apparatus when the pot magnet is magnetized the magnetic field setup magnetizes the particles and orients them to exert the desired frictional resistance to the rotation of the rotor 84, the operation being in principle similar to that above described in connection with the apparatus shown in Figs. 2 and 3.

Figure 6:
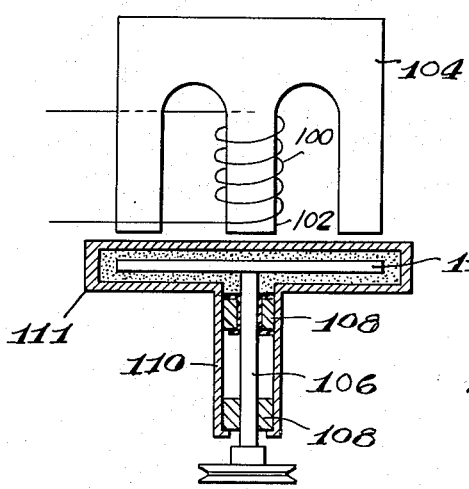

In Fig. 6 I have illustrated a further modified form of a braking mechanism wherein the electromagnet is formed by winding the coil 100 around a central member 102 of an iron bar 104. The bar 104 is provided with an annular chamber surrounding the coil, and the rotor 106 is journalled in suitable bearings 108 in a depending portion 110 of a housing 111. The upper portion of the housing is in the form of a flat, cylindrical member, which is disposed immediately below the bar 104 as shown in Fig. 6, and a magnetizable disk 112 is mounted on the upper end of the rotor shaft 106 to rotate therewith. The upper chamber of the housing is filled with the magnetizable particles, and the operation of the apparatus follows the operation above described in connection with the previous embodiments of the invention. When the magnetic field is produced by energizing the coil 100, the particles exert a definite braking effect upon the rotating disk 112.

Figure 7:
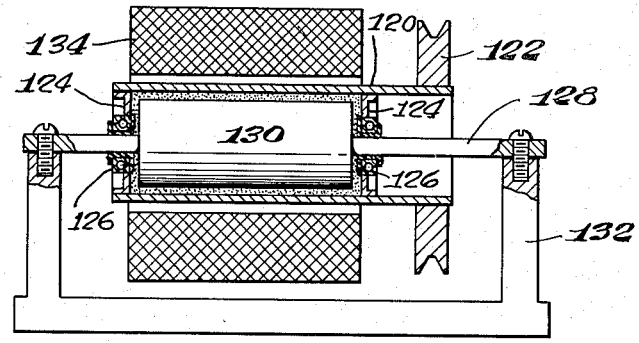
Figure 8:
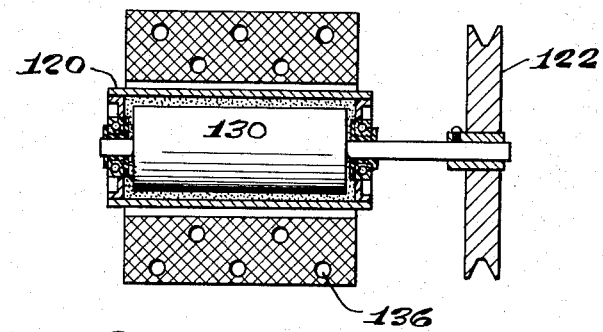

In the embodiment of the invention illustrated in Fig. 7 the rotor is formed by the tube 120 upon one end of which a pulley 122 is mounted. The interior of the tubular rotor 120 is provided with end plates 124 welded or otherwise secured to the inner surface of the tube 120, and the end plates are provided with bearings 126 through which an axle 128 extends so as to rotatably support the rotor. The axle is provided with a magnetizable drum 130 disposed within the housing as shown in Fig. 7. The interior of the housing is filled with the relatively small magnetizable members and preferably particles, and the latter may be suspended in a suitable vehicle as above described in connection with the other embodiments of the invention. The axle 128 is stationary and secured to uprights of a suitable supporting base 132, and the winding coils 134 of the electromagnet are disposed about and spaced from the rotor so that when energized the electromagnet produces a magnetic field through which the rotor and the magnetizable members therein are rotated, with the effect that the orientation of the small particles exerts a braking effect on the rotor in a similar manner as above described in connection with the other embodiments of the invention. In Fig. 8 I have illustrated a structure similar to that in Fig. 7 with the exception that the drum 130 is rotated by the pulley 122 mounted on the axle thereof and with the further exception that the housing 120 is stationary. The winding coils of the magnet may be provided with cooling coils 136 through which a cooling medium may be caused to flow to assist in dissipating the heat.

Figure 9:
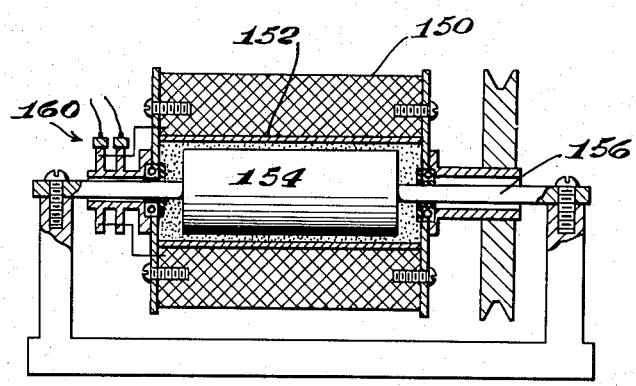

In Fig. 9 I have illustrated still another modification of the present invention and which is similar in structure to that shown in Fig. 7 with the exception that the electromagnet 150 is mounted to rotate with a spool 152, and the interior of the spool constitutes the housing for the reception of the finely divided particles or small magnetizable members together with the vehicle in which the particles or members may be suspended. A stationary drum 154 is mounted on an axle 156, and suitable bearings are provided to journal the spool structure 152 on the axle. In this structure slip rings indicated generally at 160 are provided for energizing the rotating coil of the electromagnet.

It is preferred to form the magnetizable members of a material permitting rapid de-magnetization, preferably particles of hy-mu metal or similar metal which has minimum magnetic remanence.

A plurality of units similar to those shown in Figs. 2 and 3 may be arranged in series to operate upon an elongated shaft having a plurality of disks and end plates to produce a powerful braking or clutching unit. Such elongated series arrangement, utilizing relatively small coils and disks, and distributing the power application over a relatively long unit is particularly conducive to dissipation of heat. In a preferred construction of a series arrangement, the relative polarities of the electric coils at the ends facing the rotary disks may be opposite so that a continuous magnetic field may be achieved, although in practice, other arrangements of the coils are contemplated, such as having the coils opposite each other, or having a phase difference between the coils to suit particular problems which may arise.

It is also contemplated to provide for adjustment of either a permanent or an electromagnet such as illustrated in Figs. 4 and 6 wherein the magnets may be moved into and out of the field. In such modification, a fixed magnet and a movable magnet may be used together to permit mechanical adjustment of the braking or clutching action without changing the electric current.

In addition to the serrations 48 formed in the rotary disks 40, serrations may also be formed on the inside of the spool 21 or on the inner surfaces of the end plates 12, 14, as indicated at 49, in which the mass of magnetized particles may congregate to enable the mass to exert increased friction between the rotor and the static portion of the housing. The metal particles, spheres, etc., referred to are held in a protective medium so as to guard them against oxidation and its resulting variation of surface friction. If held in gaseous suspension, I use hydrogen (which is both a good conductor of heat and a chemically reducing atmosphere). If held in a fluid, I use preferably diethylene glycol or similar compound together with inhibitors of the type used in automobile radiators as antifreezes. My reason for this is that diethylene glycol and equivalent fluids have essentially constant viscosity over a wide operating range; will forestall the rusting of the iron spheres and cylinders; will not freeze or boil off at customary operating temperatures.

From the above description it will be observed that in the present apparatus either as a brake or as a clutch, the metal particles, together with the liquid vehicle, if any, in which they may be suspended are at all times prevented from contacting the windings of the electromagnet, thus contributing to the length of life of the apparatus. The various embodiments of the invention are economical to manufacture, efficient in operation, and easy to assemble.

Having thus described the invention, what is claimed is:

1. In an electromagnetic apparatus for controlling the relative rotation of two members, in combination, one member comprising an electromagnet having its windings in the form of a hollow elongated coil, and means for supporting the electromagnet including a hollow spool-like fluid-tight metal housing forming a central chamber of relatively small diameter extending through the hollow portion of the coil and communicating end chambers of substantially larger diameter disposed adjacent the ends of the coil and forming the rims of said spool-like housing, said coil being disposed between said rims and being of substantially the same outside diameter as said rims, said spool-like chamber enclosing a fluid vehicle and a mass of small magnetizable members in the vehicle, said coil being entirely outside said housing to facilitate cooling, a second member provided with two relatively widely spaced metal disks each being disposed to rotate relatively to and within one of said large diameter end chambers with the vehicle surrounding the disks, and about the axis of the coil and across the magnetic flux at each end thereof, sealed bearing members for rotatably supporting the second member with relation to the first member and for preventing leakage of the vehicle from the housing, and means for enabling relative rotation to be imparted to said two members whereby when said magnet is deenergized said small magnetizable members are permitted to be moved freely with relation to one another upon said relative rotation with minimum friction, and when said magnet is energized the magnetic field causes orientation of said members and operates to restrain the same from being freely moved with relation to one another, and thereby causing some of them to frictionally engage said members.

2. An electromagnetic apparatus as defined in claim 1 wherein the electromagnet and its supporting housing form the stator and wherein the second members forms the rotor.

References Cited in the file of this patent

UNITED STATES PATENTS

| | | |
|---|---|---|
| 811,654 | Murphy | Feb. 6, 1906 |
| 2,519,449 | Findley | Aug. 22, 1950 |
| 2,543,394 | Winther | Feb. 27, 1951 |
| 2,575,360 | Rabinow | Nov. 20, 1951 |
| 2,605,876 | Becker | Aug. 5, 1952 |
| 2,614,668 | Waderlow et al. | Oct. 21, 1952 |
| 2,661,825 | Winslow | Dec. 8, 1953 |
| 2,671,545 | Petroff | Mar. 9, 1954 |

FOREIGN PATENTS

| | | |
|---|---|---|
| 485,591 | Belgium | Nov. 13, 1948 |
| 261,748 | Switzerland | May 31, 1949 |

OTHER REFERENCES

Publications: Technical Report 1213, National Bureau of Standards, Wash., D. C. Copy received in Patent Office, March 30, 1948.

Magnetic Fluid Clutch, General Electric Review, December 1949.